United States Patent
Vanham

(10) Patent No.: US 8,702,051 B2
(45) Date of Patent: Apr. 22, 2014

(54) ASSEMBLY FOR ATTACHING A FLEXIBLE OR RIGID CANVAS TO A RIGID FRAME

(75) Inventor: Matthieu Vanham, Gosselies (BE)

(73) Assignee: VTS SA, Gosselies (BE)

( * ) Notice: Subject to any disclaimer, the term of this patent is extended or adjusted under 35 U.S.C. 154(b) by 213 days.

(21) Appl. No.: 13/258,851

(22) PCT Filed: Mar. 25, 2010

(86) PCT No.: PCT/EP2010/053951
§ 371 (c)(1),
(2), (4) Date: Nov. 29, 2011

(87) PCT Pub. No.: WO2010/108993
PCT Pub. Date: Sep. 30, 2010

(65) Prior Publication Data
US 2012/0061539 A1  Mar. 15, 2012

(30) Foreign Application Priority Data

Mar. 25, 2009  (EP) .................................... 09156231

(51) Int. Cl.
*A47G 1/08* (2006.01)
(52) U.S. Cl.
USPC ............................. 248/477; 248/496; 40/761
(58) Field of Classification Search
USPC .............. 248/475.1, 289, 495, 496, 476, 477; 40/745, 757, 759, 761; 24/459, 460, 24/462; 403/232.1, 237, 243, 254, 255, 403/263
See application file for complete search history.

(56) References Cited

U.S. PATENT DOCUMENTS

| | | | |
|---|---|---|---|
| 3,561,074 A | 2/1971 | Mosher, Jr. et al. | |
| 4,258,494 A | 3/1981 | Borque | |
| 5,398,388 A * | 3/1995 | Coleman | 24/593.11 |
| 5,584,461 A * | 12/1996 | Pynenburg | 248/475.1 |
| 6,467,742 B1 * | 10/2002 | Pitcher | 248/205.3 |
| 6,546,658 B2 * | 4/2003 | Pitcher et al. | 40/658 |
| 6,779,771 B2 * | 8/2004 | Ostrovsky et al. | 248/316.7 |
| 7,165,296 B2 * | 1/2007 | Coleman | 24/462 |
| 2003/0131954 A1 | 7/2003 | Taylor et al. | |
| 2006/0151515 A1 * | 7/2006 | Hood et al. | 221/29 |
| 2006/0242805 A1 | 11/2006 | Coleman | |

FOREIGN PATENT DOCUMENTS

WO   WO 94/27273 A1   11/1994
WO   WO 2010/108993 A1   9/2010

* cited by examiner

*Primary Examiner* — Steven Marsh
(74) *Attorney, Agent, or Firm* — Reinhart Boerner Van Deuren P.C.

(57) ABSTRACT

An assembly for attaching a flexible or rigid canvas (2) comprising eyelets (24) to a support comprises a rigid frame (4, 4', 5, 6) forming the support, a first attachment means arranged to be directly secured to the canvas (2) and a second attachment means provided within the frame and capable of receiving the first attachment means. The second attachment means is formed of an open housing (3). The housing comprises two walls (4, 4') which are spaced apart and are arranged opposite to each other. Each wall is provided on its internal surface (4", 4''') with a notched or toothed portion arranged to hold the first attachment means when in use.

15 Claims, 9 Drawing Sheets

ASSEMBLY FOR ATTACHING A FLEXIBLE OR RIGID CANVAS TO A RIGID FRAME

FIELD OF THE INVENTION

The present invention relates to a device for attaching a flexible or rigid canvas comprising eyelets to a rigid frame.

STATE OF THE ART

Many devices are known for attaching canvas and in particular canvases of large or very large size, i.e. having a size of more than 10 m², to rigid or even reinforced frames. Usually, these canvases are provided with eyelets which consist of an aperture or an orifice, preferably of circular shape, within the canvas, and with a protective member with a shape identical to that of the aperture or orifice (e.g. ring-like), generally made of metal or plastic, which allows said canvas to be protected from being torn.

These canvases are attached to frames by means of ropes or flexible links. In the case of outdoor use, it is observed that these ropes or flexible links tend to loosen under the effect of weather and pressure exerted by wind or rain for example. The fact that the canvases loosen may lead to deterioration of the canvases or to the detachment of the latter from their support. Further, the presence of such ropes or such links is usually visible to the viewer and drives away the latter from the message borne by the canvas.

Finally, when the canvases have to be replaced, it is necessary to remove each of the links one by one, the attachment being carried out individually for each eyelet, or else to undo the totality of the ropes if the latter are common to all the eyelets.

Document US 2003/131954 discloses a screen assembly comprising frame members defining an opening wherein retaining means are provided adapted to non-releasably retain an insert. The insert includes two opposing side walls, the internal surfaces of which are grooved and adapted to retain an edge portion of the meshed screen. The external surface of the side walls are arranged to fit tightly into the retaining means.

A disadvantage of the above assembly is that the insert must be inserted into the frame members before interconnecting the frame members. It follows that the screen can not be removed from the frame without decomposing the frame.

AIMS OF THE INVENTION

The present invention aims at proposing a device for attaching a canvas, in particular a flexible canvas, directly to a support formed by a rigid frame, which does not have the drawbacks of the state of the art.

In particular, the present invention aims at proposing a device for attaching a canvas and in particular a flexible canvas, with which the attachment and also the detachment can be carried out rapidly, easily and without using cords or ropes.

It is an additional object of the present invention to propose a solution which enables to hide the eyelets to the spectator.

Finally, the present invention aims accessorily at proposing a solution which allows the canvas to be easily retightened in the case of undesired loosening.

SUMMARY OF THE INVENTION

The present invention relates to an assembly for attaching a flexible or rigid canvas to a support as set out in the appended claims. The canvas should comprise eyelets, such as, but not limited to, those allowing to fasten the canvas to a support by a rope or a cord, as is known in the art. However, no rope, nor cord need be used in the assembly according to the present invention. The support to which the canvas is to be attached is formed by a rigid frame.

According to a first aspect of the invention, there is provided an assembly, comprising a rigid frame, a first attachment means arranged to be directly secured to the canvas and a second attachment means provided within (and along) the frame and capable of receiving the first attachment means. The second attachment means is formed of an open housing comprising two walls spaced apart and arranged opposite to each other. Each wall is provided on its internal surface with a notched or toothed portion arranged to hold the first attachment means.

A first characterizing feature of the assembly is that the first attachment means consists of two (i.e. a pair of) push-fit fastening members. Each push-fit fastening member has a part arranged to fit through an eyelet of the canvas. The parts of both push-fit fastening members together form a push-fit connector (meaning that each one part of the push-fit fastening members comprises at least a push-fit connector plug or socket), so that, in use, by push-fitting said parts through the eyelet, the first attachment means can be directly secured to the canvas.

Another characterizing feature is that each of the push-fit fastening members comprises at least one lug arranged to engage the corresponding toothed or notched portion of the open housing when in use. Advantageously, the lug has an elasticity such that it can pass from one tooth to another when a force is exerted thereon.

Such an assembly does not require any rope or cord. The first attachment means can be easily be inserted and removed from the housing, without disassembling the frame. This is an advantage for canvases that carry promotional messages, which need to be changed frequently.

Furthermore, tensioning of the canvas can easily by performed by pushing the first attachment means further along the notched or toothed portion within the housing.

Another advantage is that the first attachment means can have fixed dimensions which are independent of the canvas' size. They are only dependent on the eyelets' size and the size of the housing of the frame. There is therefore no need to provide profiles as long as the canvas' size for clamping the canvas therein.

Therefore, preferably, the assembly comprises a plurality of first attachment means, advantageously uniformly distributed along the canvas' edge(s).

Preferably, the push-fit fastening members are identical, each member comprising both a push-fit connector plug and a push-fit connector socket, such that when the members are arranged opposite to each other, the push-fit connector plug and socket of one member are facing corresponding push-fit connector socket and plug of the other member, enabling the push-fit fastening members to be connected by engagement of the corresponding plugs and sockets.

This has the advantage that only a single form of push-fit fastening member need be produced and used (instead of two: one for a plug and one for a socket), which is more economical and saves time during assembly of the first attachment means to the canvas.

Preferably, the push-fit connector plug and socket are both provided on the same part that is arranged to fit through the eyelet. Hence, the first attachment means is secured to a single canvas' eyelet only.

Preferably, the lug projects away from the side comprising the part arranged to fit through the eyelet.

Preferably, each push-fit fastening member comprises a support of hexagonal shape. More preferably, the support of hexagonal shape is interposed between the part arranged to fit through the eyelet and the lug. A hexagonal shape allows easy insertion and removal of the first attachment means into/from the second attachment means (housing).

Preferably, the frame has rectangular shape and consists of a rigid profile for each of the four sides thereof. Each of the profiles comprises the second attachment means. More preferably, the rigid profile comprises a front and a back wall, the space provided between both front and back walls defining said open housing. The front and back wall hence can correspond to the walls of the open housing.

Preferably, the notched or toothed portions within the open housing have notches or teeth which are not symmetrical. This enables the first attachment means to remain in position even when high loads, such as due to harsh weather conditions, are exerted on the canvas. As a result, the canvas can remain tensioned during an extended service life.

Preferably, the open housing is U-shaped, having an opening at an end oriented towards the inside of the frame. The open end is where the first attachment means and therefore the canvas is arranged to be inserted. It follows that the border of the canvas, including eyelets and preferably also the first attachment means can be hidden.

According to a second aspect of the invention, there is provided a push-fit fastening member for use in assemblies of the invention as recited above. The push-fit fastening member can be provided with any of the features specified above.

Preferably, the push-fit fastening member comprises at one side a part arranged to fit through an eyelet of a canvas, said part comprising a push-fit connector. The push-fit connector is arranged for connecting to (a corresponding push-fit connector of) a second push-fit fastening member through the eyelet, so that, by connecting, both fastening members can be secured to the canvas. The member further comprises a lug projecting away from the side comprising the part arranged to fit through the eyelet. The lug is arranged to engage a notched or toothed surface and advantageously comprises a resilience.

Preferably, said part arranged to fit through the eyelet comprises both a push-fit connector plug and a push-fit connector socket, so that when two such identical members are arranged opposite to each other, the push-fit connector plug and socket of one member are facing corresponding push-fit connector socket and plug of the other member, enabling the push-fit fastening members to be connected by engagement of the corresponding plugs and sockets. It follows that a pair of push-fit fastening members is connected simultaneously by two pairs of push-fit connector plug and socket.

Preferably, the push-fit connector plug and socket are so formed and are so provided adjacent to each other, that when two identical push-fit fastening members are connected, the push-fit connector plugs and sockets all together form a (single) cylindrical outer surface fittable in the eyelet.

Preferably, the push-fit fastening member comprises a support of hexagonal shape interposed between the part arranged to fit through the eyelet and the lug.

DETAILED DESCRIPTION OF THE INVENTION

The present invention relates to an assembly for attaching a flexible or rigid canvas comprising eyelets, to a support formed by a rigid frame, comprising:
 a first attachment means directly secured to the canvas, and
 a second attachment means present within the frame and capable of receiving said first means.
A feature of the assembly is that the first means consists of two push-fit fastening members which fit into each other through an eyelet of the canvas, these push-fit fastening members each comprising at least one lug. Another feature is that the second means is arranged as an open housing provided with a notched or toothed portion in which the lug(s) of the push-fit fastening members are arranged to be positioned.

Preferably, the push-fit fastening members are identical and each have a lug.

Preferably, each push-fit fastening member comprises a male portion (i.e. a connector plug) and a female portion (i.e. a connector socket), the male and female portions being conformed so as to be able to fit perfectly into each other.

Preferably, the frame consists of a rigid profile forming the four sides of the frame, each of the profiles being provided with the second attachment means within the frame.

Preferably, the rigid profile comprises at least two walls, the space provided between both internal and external walls defining a housing in which the push-fit fastening members are housed.

Preferably, the internal surface of the side walls of the housing have notched or toothed areas positioned perpendicularly to the axis of each of the sides of the profile forming the frame.

Preferably, the diameter of the largest sphere that can be entirely contained in the housing defined by the internal faces of the rigid profile, is larger than the diameter of the smallest sphere circumscribing the external surface of the push-fit fastening member, the lugs being circumscribed to the circle.

Preferably, the diameter of the smallest sphere circumscribing the housing defined by the internal faces of the rigid profile is larger than the distance between the ends of the lugs of both push-fit fastening members, fastened to each other with a push-fit connector.

Figure 1:
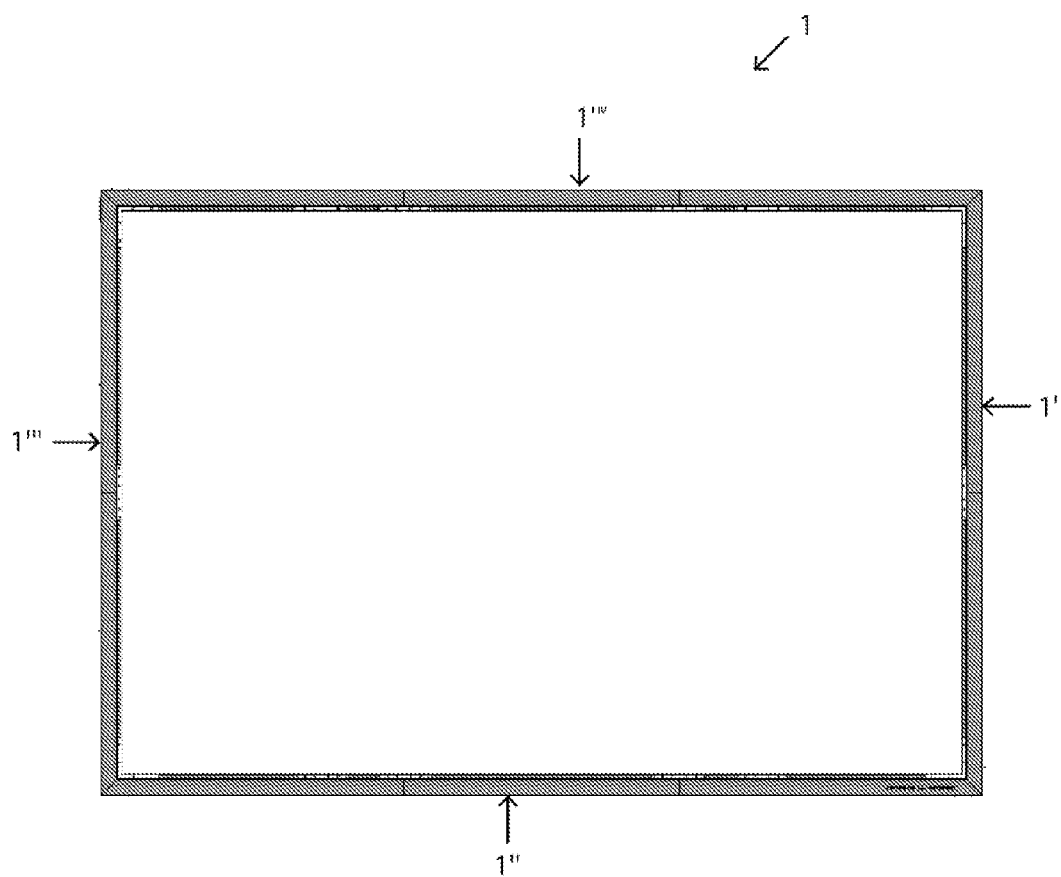
FIG. 1 represents a planar view of a support and more particularly a rigid frame according to the present invention.

FIG. 1 represents a planar view of a frame 1 in which a canvas 2, preferably a canvas of large size and having for example a size greater than 10 m², is placed.

This frame 1 consists of four parts or members, two transverse members which are uprights positioned vertically, viz. the uprights 1' and 1", and two longitudinal members 1''' and 1'''' which are uprights positioned horizontally.

The present invention is therefore directed at proposing a solution which enables this canvas 2 to be directly attached to said rigid frame 1.

This frame 1 may be a strengthened or reinforced frame.

Figure 2:
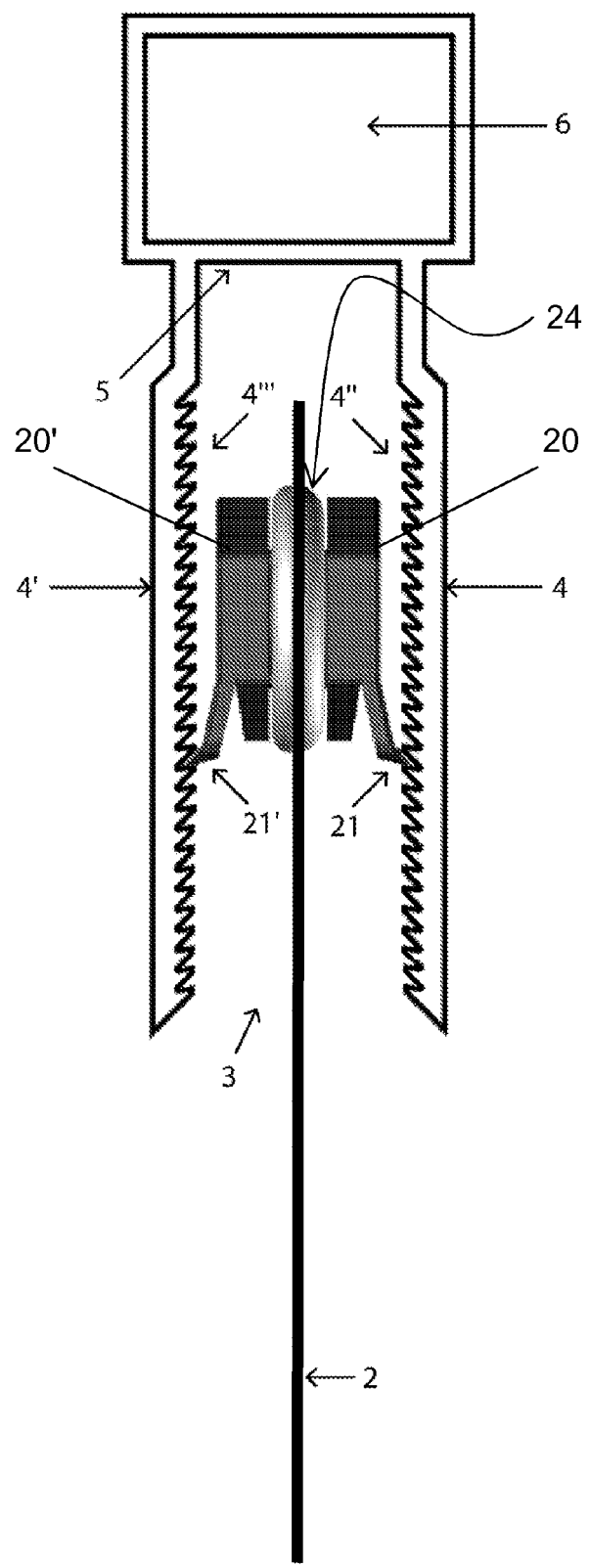
FIG. 2 represents a cross-sectional view of a support and more particularly of a frame according to a first embodiment of the present invention.
Figure 3:
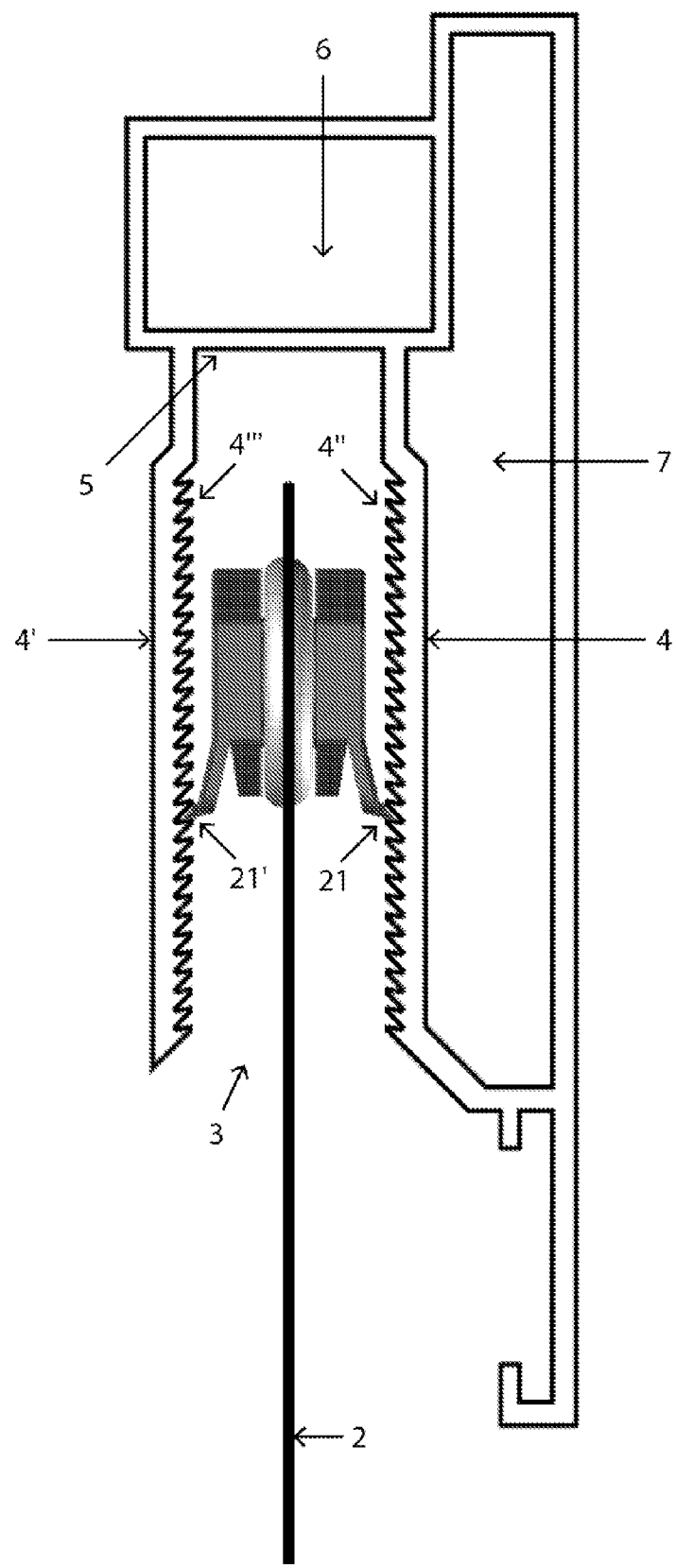
FIG. 3 represents a cross-sectional view of a support and more particularly of a frame according to a second embodiment of the present invention.
Figure 4:
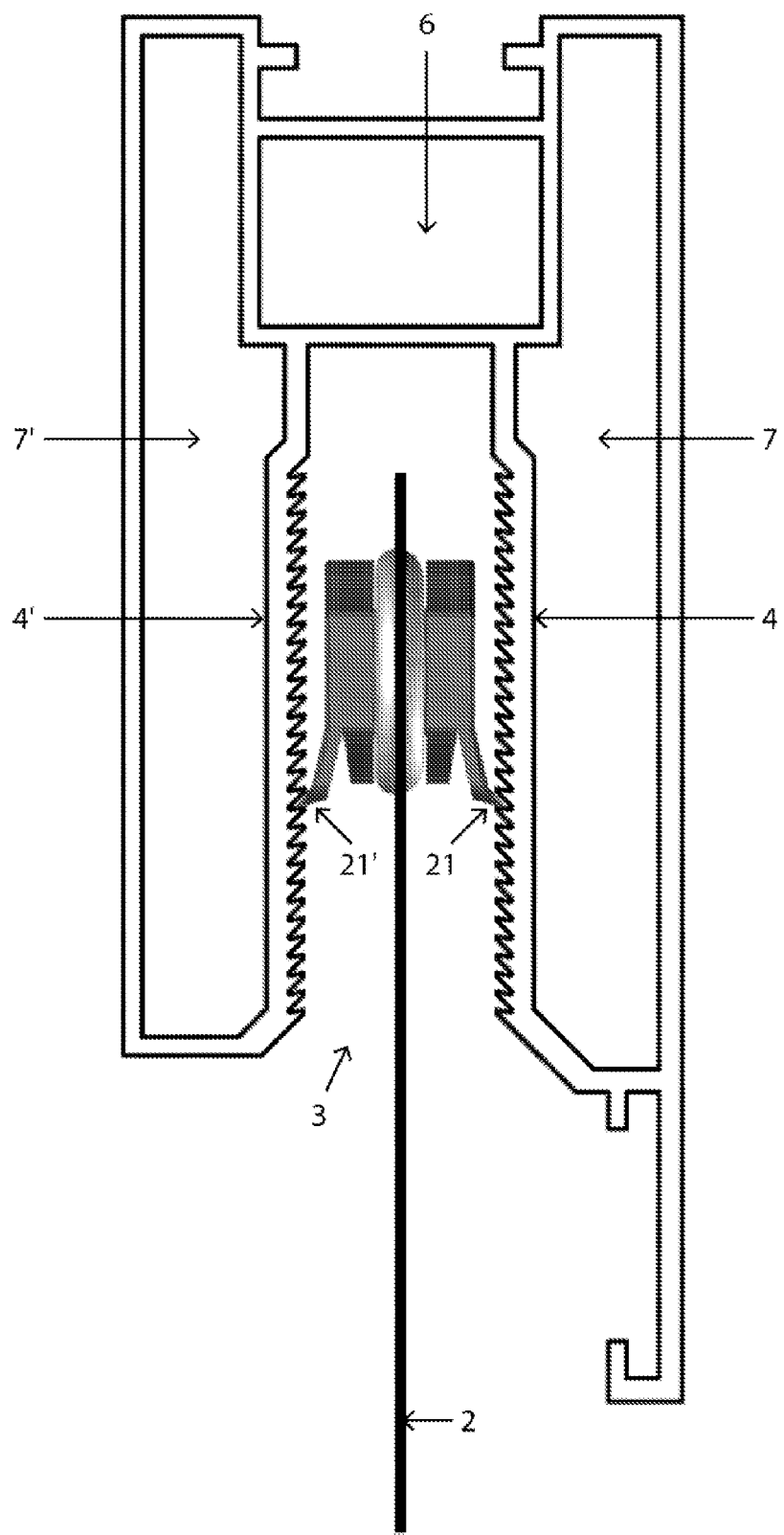
FIG. 4 represents a cross-sectional view of a support and more particularly of a frame according to a third embodiment of the present invention.

FIGS. 2, 3 and 4 represent cross-sectional views of a rigid profile forming an upright, according to several embodiments.

Each profile of the frame is provided with an open housing 3 into which the means for attaching the canvas may be inserted.

This housing 3 is U-shaped and comprises two sidewalls 4, 4' which form both legs of the U and a bottom wall 5, which is positioned at the end opposite to the opening of the housing 3.

The housing 3 is opened at the end oriented towards the inner side of the frame 1.

The dimensions of the opening of the housing 3 are selected so as to allow the introduction of the means for attaching the canvas.

A rigidity chamber 6 is advantageously affixed to the end of the housing forming the bottom wall 5.

The purpose of this chamber is both to increase the rigidity but also the solidity of the uprights 1', 1", 1''', 1'ᵛ.

The sidewalls 4, 4' of the housing 3 are each provided on their internal face 4", 4''' with a notched or toothed area.

Preferably, the individual elements of this area (teeth or notches) are not symmetrical.

Preferably, the tilt axis of the teeth or notches is directed towards the bottom wall, more specifically in a direction opposite to the open end of the housing.

The (asymmetrical) shape of the teeth or the notches is so arranged as to hold the means for attaching the canvas in a predetermined position and as to prevent slipping of the attaching means within the housing in a direction parallel to the side walls.

The length of the sidewalls 4, 4' of the housing 3 corresponds at least to the largest dimension, i.e. the maximum size of the push-fit fastening members.

Advantageously, the length of the sidewalls 4, 4' of the housing corresponds to two or three times the maximum size of the push-fit fastening members 20, 20'.

According to an embodiment, more particularly illustrated in FIG. 2, the profile is of a simple shape and comprises a housing 3 simply surmounted with a rigidity chamber 6.

In an embodiment illustrated in FIG. 3, the profile is of a more complex shape and comprises a housing 3 surmounted with a rigidity chamber 6, wherein the rear face of the profile is provided with an additional reinforcing chamber 7, the height of which corresponds at least to the height of the housing and of the juxtaposed rigidity chamber.

In this second embodiment, complementary reinforcing members with which the assembly may be rigidified are also illustrated.

According to a third embodiment and which is the preferred embodiment, not only the rear face is provided with a reinforcing chamber 7 as illustrated in FIG. 3, but also the front face is provided with a second strengthening chamber 7', the full height of which corresponds to at least the height of the housing and of the juxtaposed rigidity chamber.

This profile may either be a symmetrical profile or not.

Suitably, as illustrated in FIG. 3, provision may also be made for complementary reinforcing members with which the assembly may be rigidified, and more particularly by which the canvas may be supported.

Figure 5:
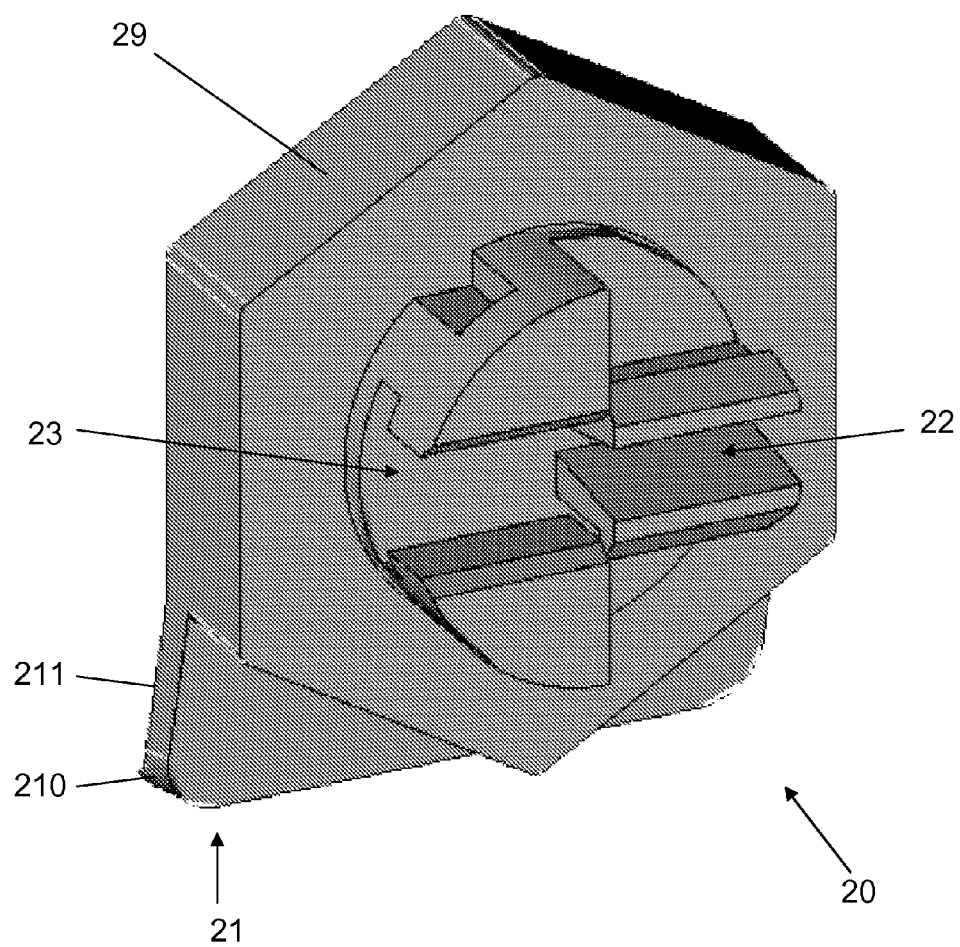
FIG. 5 represents a perspective view of a fastening member forming one part of a push-fit connector.
Figure 6:
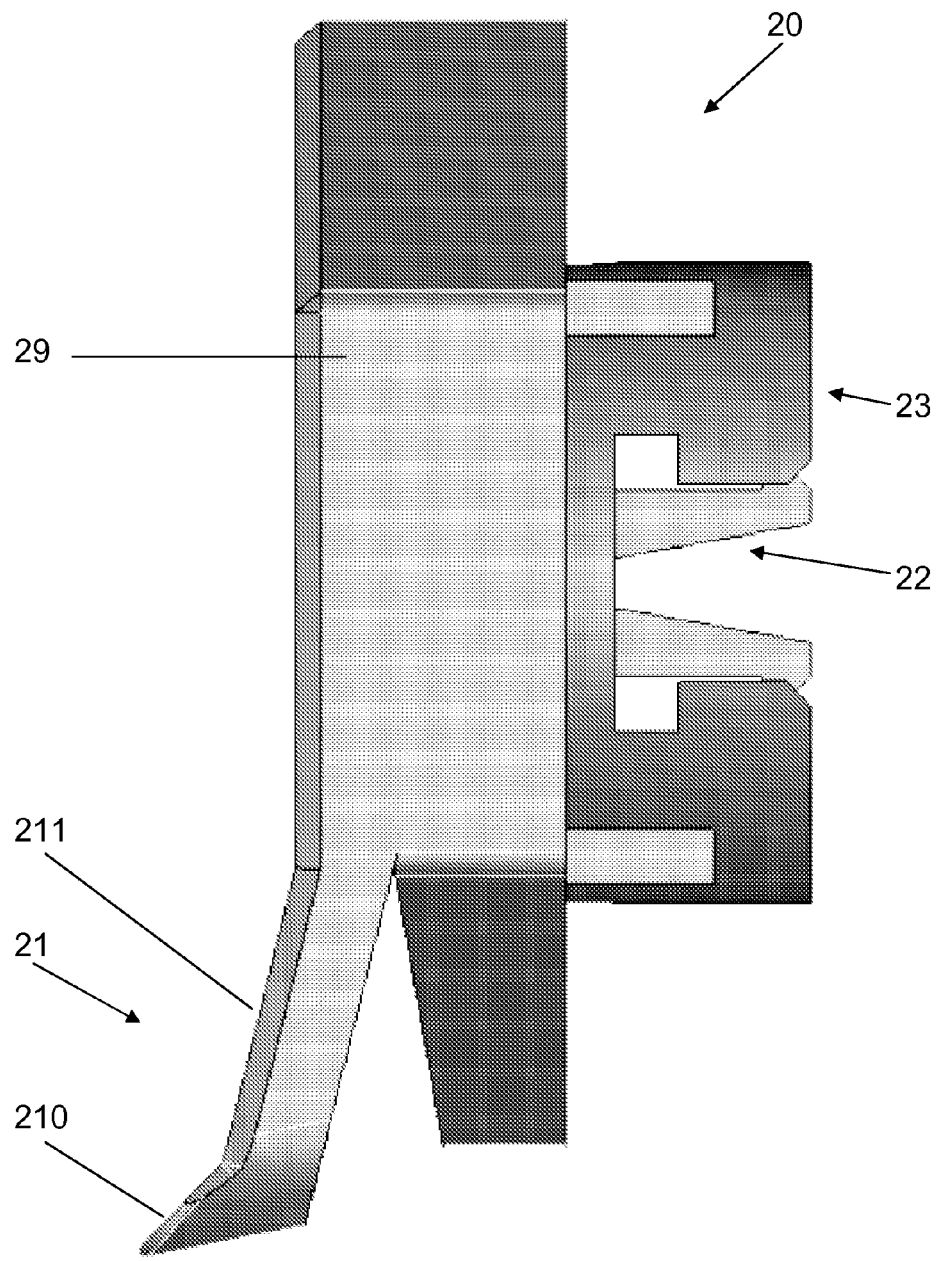
FIG. 6 shows a lateral view of the member of FIG. 5.
Figure 7:
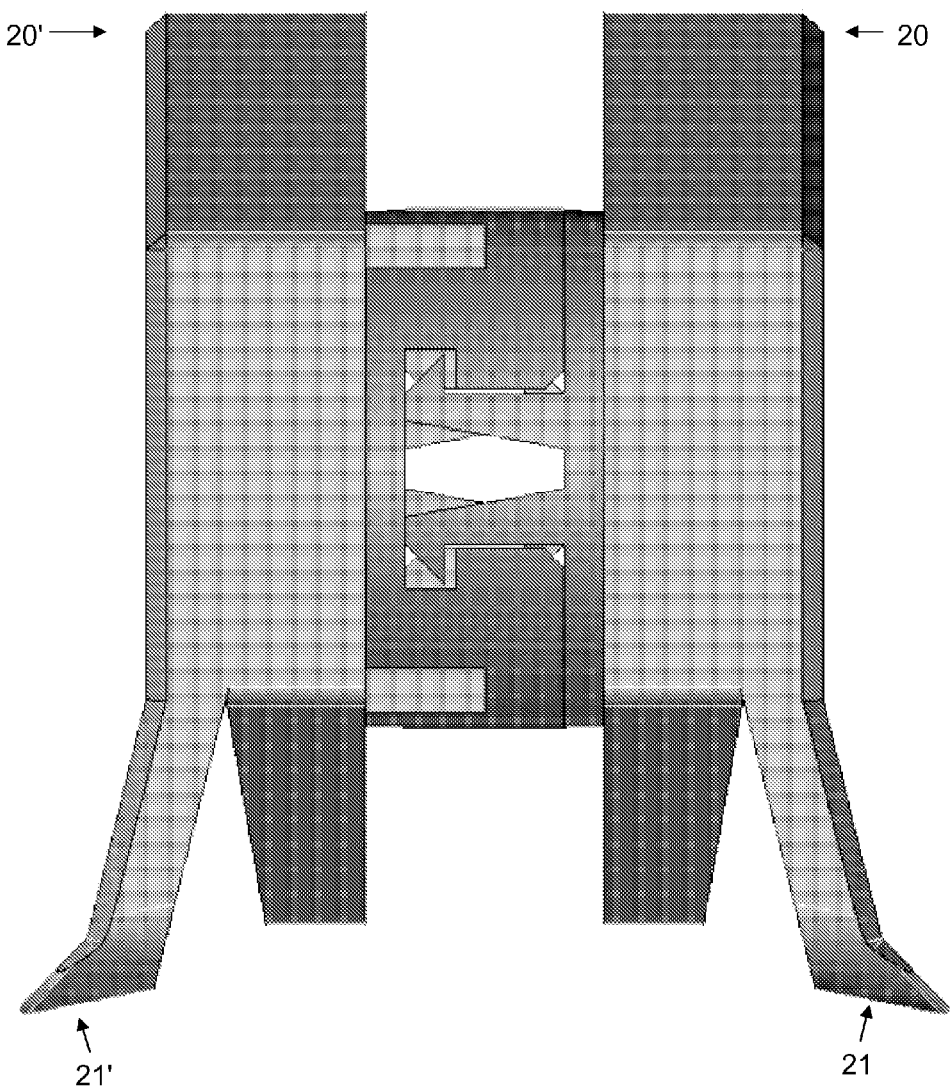
FIG. 7 shows two members as in FIG. 5 fastened to each other by means of a push-fit connector.
Figure 8:
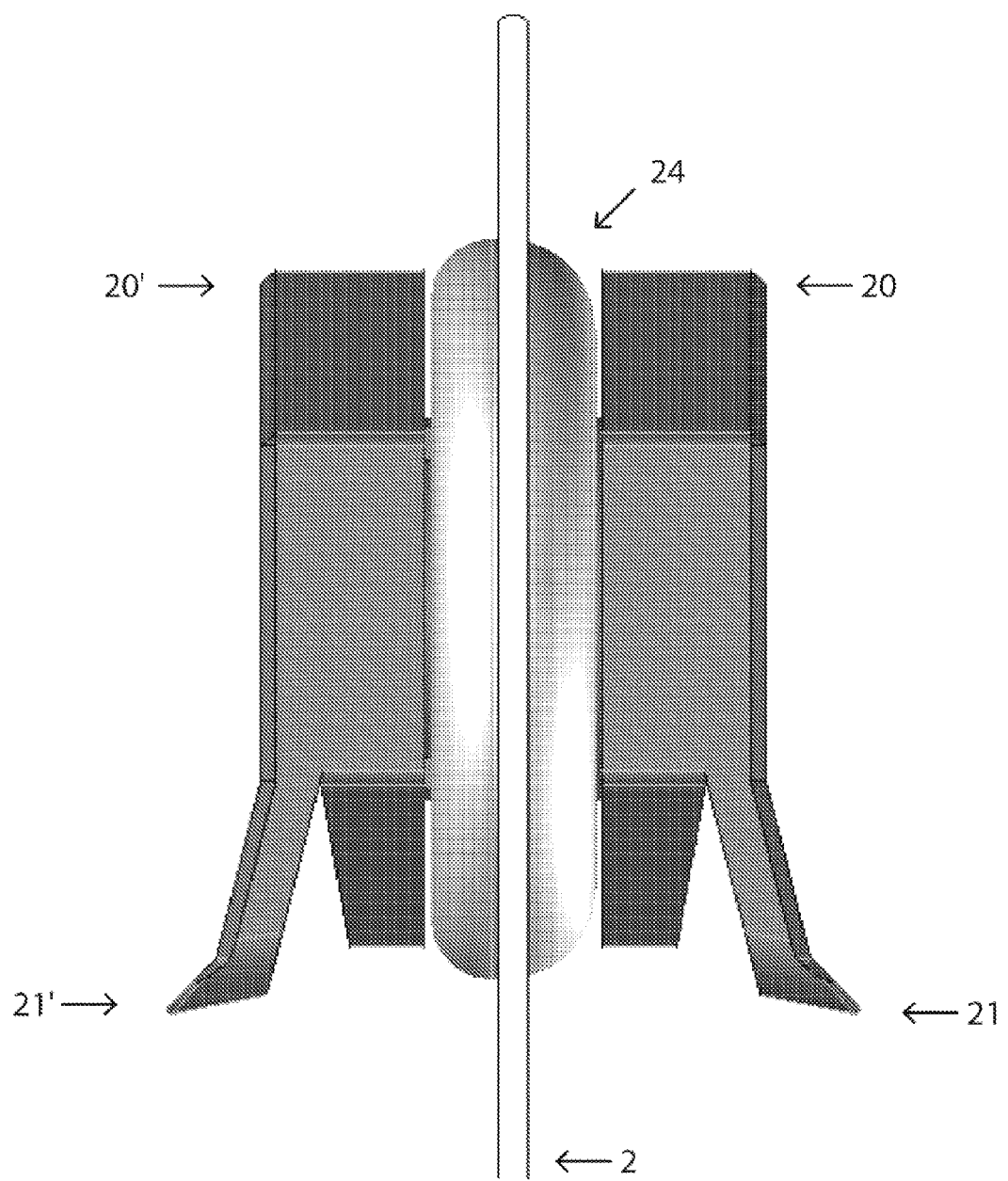
FIG. 8 shows a lateral view of the two members of FIG. 7 which are directly attached in an eyelet of a canvas.
Figure 9:
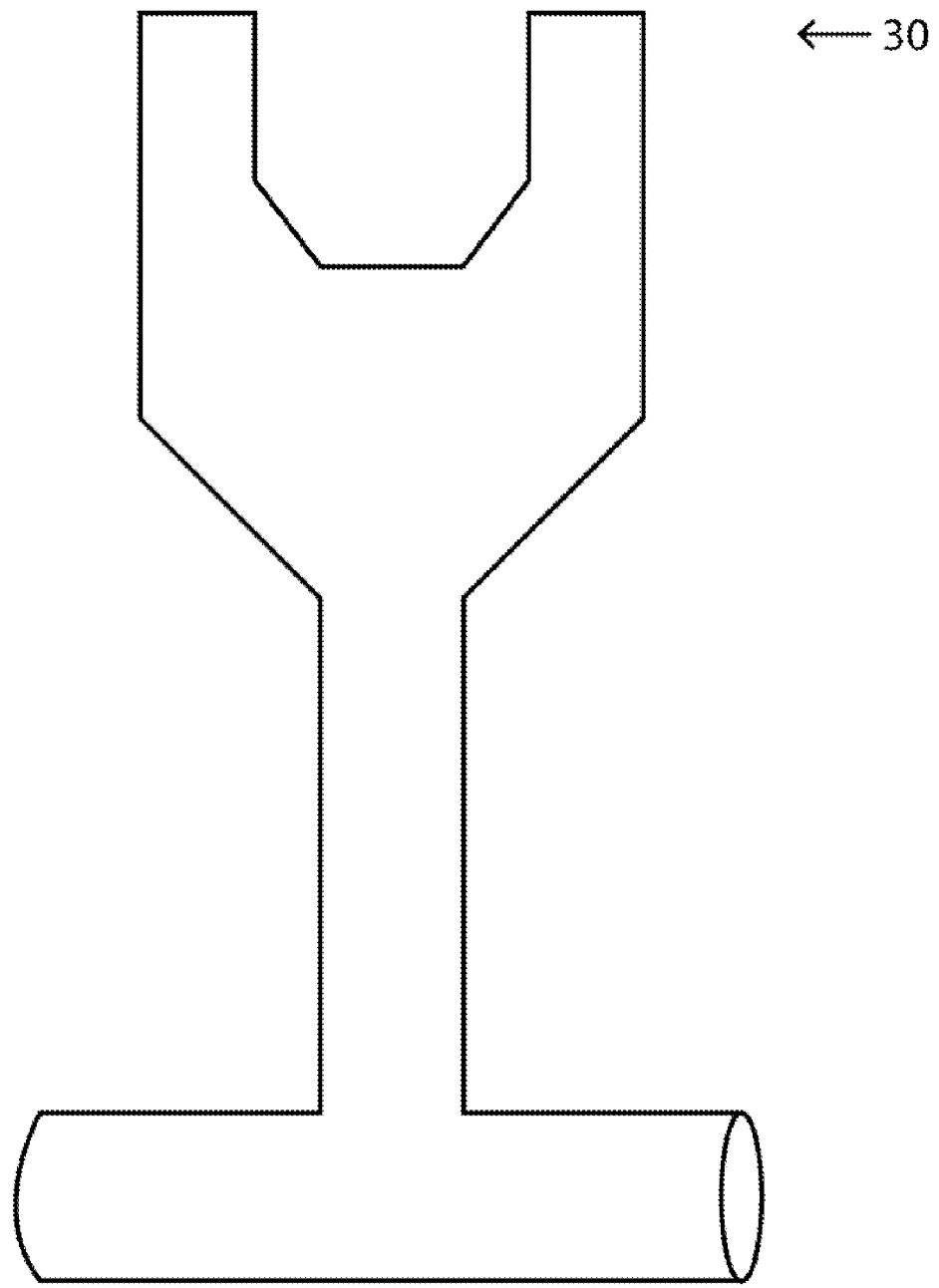
FIG. 9 represents a schematic view of the tool intended to detach both push-fit fastening members from the frame.

FIGS. 5, 6 illustrate a perspective and sectional view of a push-fit fastening member 20. FIG. 7 represents two members 20, 20' as described in FIGS. 5 and 6 which are fastened to each other with push-fit connectors. FIG. 8 represents two members 20, 20' fastened to each other with push-fit connectors and directly attached in an eyelet of a canvas 2.

The means for attaching the canvas is formed by connecting a pair of push-fit fastening members 20, 20' to each other. The push-fit connectors refer to a connector plug and corresponding connector socket, which are releasably connectable to each other by pushing the plug into the socket. By so doing, the plug clicks into the socket.

The push-fit connectors are provided on a part of the push-fit fastening member 20, 20' which is arranged to fit through an eyelet 24 of the canvas 2. This means that the push-fit connector should have a size which enables it to fit through the eyelet 24.

In the present invention, the eyelet has preferably a size of at least 7 mm, preferably at least 10 mm.

Such eyelets are typically of circular shape. It is therefore preferable that the push-fit connector, when connected, shows an at least partly circular or cylindrical outer shape as well.

With reference to FIGS. 5-6, each of the attachment members arranged to form the push-fit connector has a lug 21, 21'.

This lug 21, 21' is formed by a rigid projection, the dimensions of which are calculated in such a way that it will snugly fit into the notched or toothed portions of the sidewalls of the housing of the profile.

The lug 21, 21' refers to a projection having a barb-like shape. It extends away from that side of the member which is provided with the push-fit connector.

This lug 21, 21' also has a slight elasticity so that it can pass from one tooth to the next one when force or pressure is exerted on the lug.

The required elasticity can be obtained by the choice of material and design. The lug 21 is therefore preferably formed as a projecting lip 210, connected to the push-fastening member 20 by a lever 211.

Hence, when the pair of push-fit fastening members 20 and 20' is connected to each other, thereby forming the first attachment means, it can be inserted in the housing 3 through the opening and further pushed along the toothed or notched area until the canvas is tensioned as desired. An asymmetrical shape of the teeth can prevent the lugs to move in the opposite direction (i.e. out of the housing).

Preferably, the positioning of the lugs 21, 21' is such that they appear decentered relatively to the upper surfaces of the push-fit fastening members 20, 20'.

By connecting two push-fit fastening members 20, 20', a means for attaching the canvas is obtained having two lugs, one on each (lateral) side, which project away from each other, as can be seen in FIGS. 2-4 and FIG. 8. By inserting the attachment means, which is fastened to the canvas since it fits through an eyelet 24, in the housing 3, the lugs engage with the notched/toothed portions and are thereby kept in position.

In a particularly advantageous way, the push-fit fastening member 20, 20' represented in FIGS. 5 and 6 has a male portion (push-fit connector plug) 22 on the one hand and a female portion (push-fit connector socket) 23 on the other hand which are arranged to suitably fit into the corresponding male or female portions of a second push-fit fastening member when both push-fit fastening members are secured together.

In a particularly advantageous way, the design is selected so that two identical push-fit fastening members 20, 20', if positioned opposite to each other, will exactly fit together.

The male and female portions are present on a support which corresponds to half the size of the eyelet.

The female portion appears on one half while the male portion appears on the other half of the part that is arranged to fit through the eyelet.

Each of the push-fit fastening members also has a support 29 which preferably has a hexagonal shape.

The support 29 advantageously acts as a flange enabling to keep the eyelet 24 in place. Hence, the support preferably has larger size than the part arranged to fit through the eyelet, and has a larger size than the eyelet 24.

The support 29 is advantageously interposed between the part arranged to fit through the eyelet 24 and the lug 21.

The hexagonal shape is selected so as to be able to provide a tool 30 which will allow said attachment member to be pushed into the interior of the notched or toothed portions of the housing.

The hexagonal shaped support is preferably interposed between the push-fit connectors (part that is arranged to fit through the eyelet) and the lug.

It is an advantage of the invention that the push-fit fastening members can be attached (secured) to the canvas before attaching the canvas to the frame.

By rotating the push-fit fastening member in the housing 3, with the aid of the tool 30, the lugs are forced out of the notches or teeth, which allows the canvas to be removed from the frame.

By exerting a compressive force on the lugs 21, 21' of the push-fit fastening members 20, 20', when these are connected, it is possible to unplug or release the push-fit connector.

Preferably, the diameter of the largest sphere which can be entirely contained in the housing 3 defined by the internal faces of the housing 3 of the rigid profile, is larger than the diameter of the smallest sphere circumscribing the external surface of the push-fit fastening member, the lugs 21,21' being circumscribed to the circle.

Preferably, the diameter of the smallest sphere circumscribing the housing 3 defined by the internal faces of the rigid profile is larger than the distance between the ends of the lugs of two push-fit fastening members fastened with push-fit connectors to each other, which can be entirely contained in the housing defined by the internal faces of the rigid profile.

The invention claimed is:

1. An assembly for attaching a flexible or rigid canvas comprising eyelets to a support formed by a rigid frame, comprising:
   the rigid frame,
   a first attachment means arranged to be directly secured to the canvas,
   a second attachment means provided within the frame and capable of receiving the first attachment means, the second attachment means being formed of an open housing comprising two walls spaced apart and arranged opposite to each other, each wall provided on its internal surface with a notched or toothed portion arranged to hold the first attachment means,
   wherein:
   the first attachment means consists of two push-fit fastening members, each push-fit fastening member having a part arranged to fit through an eyelet of the canvas, said parts of both push-fit fastening members together forming a push-fit connector, so that, in use, by push-fitting said parts through the eyelet, the first attachment means can be directly secured to the canvas, and
   each of the push-fit fastening members comprises at least one lug arranged to engage the corresponding toothed or notched portion of the open housing when in use, the lug having an elasticity such that it can pass from one tooth to another when a force is exerted thereon.

2. The assembly of claim 1, wherein the push-fit fastening members are identical, each member comprising both a push-fit connector plug and a push-fit connector socket, such that when the members are arranged opposite to each other, the push-fit connector plug and socket of one member are facing corresponding push-fit connector socket and plug of the other member, enabling the push-fit fastening members to be connected.

3. The assembly of claim 2, wherein the push-fit connector plug and socket are both provided on the part arranged to fit through the eyelet.

4. The assembly of claim 1, wherein the lug projects away from the side comprising the part arranged to fit through the eyelet.

5. The assembly of claim 1, wherein each push-fit fastening member comprises a support of hexagonal shape.

6. The assembly of claim 5, wherein the support of hexagonal shape is interposed between the part arranged to fit through the eyelet and the lug.

7. The assembly of any claim 1, wherein the frame has rectangular shape and consists of a rigid profile forming the four sides thereof, each of the profiles comprising the second attachment means.

8. The assembly of claim 7, comprising, in use, a first attachment means for each eyelet of the canvas.

9. The assembly of claim 1, wherein the notched or toothed portions within the open housing have notches or teeth which are not symmetrical.

10. The assembly of claim 1, wherein the open housing is U-shaped, having an opening at an end oriented towards the inside of the frame.

11. The assembly of claim 1, wherein a largest sphere that can be entirely contained between the internal surfaces of the walls of the housing has a diameter which is larger than a diameter of a smallest sphere circumscribing the push-fit fastening member, the lugs being circumscribed in the smallest sphere.

12. The assembly of claim 1, wherein the part of the push-fit fastening member of a first push-fit fastener member arranged to fit through an eyelet of the canvas, comprises a push-fit connector for connecting to a second push-fit fastening member through the eyelet, wherein the part extends at one side of the push-fit fastening member, and wherein the at least one lug projects from a side opposite said one side.

13. The assembly of claim 2, wherein the push-fit fastening members are configured to be connected through the eyelet by engagement of the corresponding sockets and plugs.

14. The assembly of claim 13, wherein the push-fit connector plug and socket are so formed and are so provided adjacent to each other, that when two identical push-fit fastening members are connected, the push-fit connector plugs and sockets all together have a cylindrical outer surface fittable in the eyelet.

15. The assembly of claim 1, wherein a largest sphere inscribed between the internal surfaces of the walls of the housing has a diameter which is smaller than a distance between ends of the lugs of the two push-fit fastening members, when fastened to each other through the push-fit connector.

* * * * *